United States Patent [19]

Julian

[11] Patent Number: 5,480,606
[45] Date of Patent: Jan. 2, 1996

[54] METHOD AND APPARATUS FOR REVERSE GATED COMPRESSION MOLDING OF THERMOPLASTIC MATERIAL

[75] Inventor: Randall K. Julian, Evansville, Ind.

[73] Assignee: Sunbeam Plastics Corporation, Evansville, Ind.

[21] Appl. No.: 351,504

[22] Filed: Dec. 7, 1994

[51] Int. Cl.⁶ .......................... B29C 43/36; B29C 45/34; B29C 45/56

[52] U.S. Cl. ...................... 264/328.7; 264/320; 425/555; 425/420; 425/812

[58] Field of Search ............................ 264/39, 102, 320, 264/2.2, 2.7, 328.7; 425/546, 555, 419, 420, 812

[56] References Cited

U.S. PATENT DOCUMENTS

| | | |
|---|---|---|
| 775,706 | 11/1904 | Leigh ........................................ 425/420 |
| 3,267,532 | 8/1966 | Zuev et al. . |
| 4,091,057 | 5/1978 | Weber .................................... 264/328.7 |
| 4,932,857 | 6/1990 | Nishino et al. .......................... 425/394 |
| 5,057,255 | 10/1991 | Sato et al. ............................... 264/40.5 |
| 5,073,329 | 12/1991 | Carrara .................................. 264/297.5 |
| 5,200,133 | 4/1993 | Dieul et al. ............................. 264/257 |
| 5,221,509 | 6/1993 | Fujimoto et al. ..................... 264/328.7 |
| 5,252,269 | 10/1993 | Hara et al. .............................. 264/45.3 |
| 5,256,350 | 10/1993 | Franzini et al. ........................ 264/102 |
| 5,281,376 | 1/1994 | Hara et al. .............................. 264/46.4 |

*Primary Examiner*—Jill L. Heitbrink
*Attorney, Agent, or Firm*—Gifford, Krass, Groh, Sprinkle, Patmore, Anderson & Citkowski

[57] ABSTRACT

Reverse gating is added to a conventional compression molding machine so that when the molding cavity is filled with material in excess of the amount required to mold a part, the material flows from the cavity to a pressure chamber to be vented. Pressure in the chamber allows back flow of the material from the chamber to the molding cavity during cooling to compensate for shrinkage.

12 Claims, 1 Drawing Sheet

U.S. Patent
Jan. 2, 1996
5,480,606
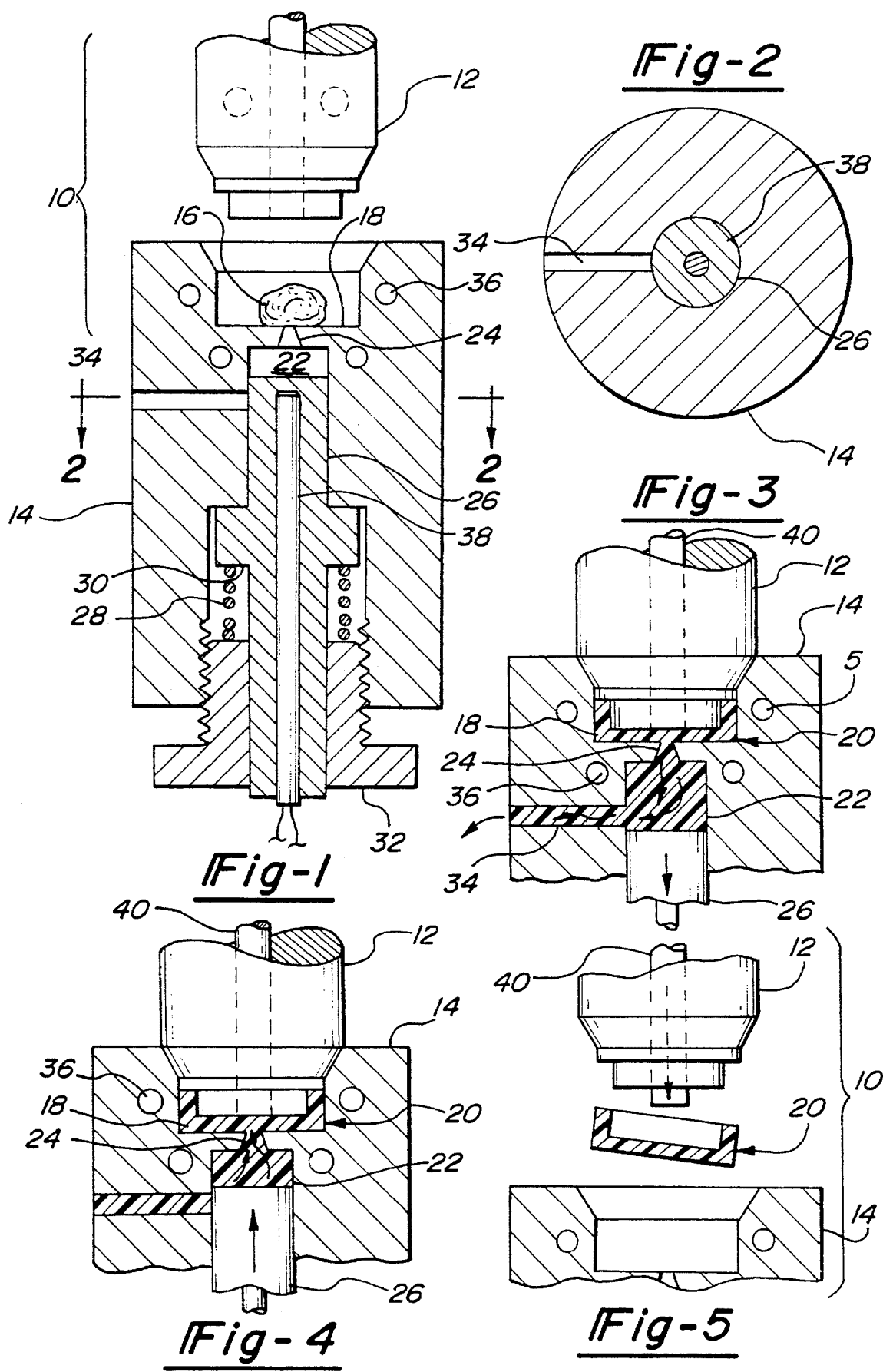

METHOD AND APPARATUS FOR REVERSE GATED COMPRESSION MOLDING OF THERMOPLASTIC MATERIAL

BACKGROUND OF THE INVENTION

1. Field of the Invention

This invention relates to a method and apparatus for molding plastic material, and, more particularly, this invention relates to compression molding of thermoplastic material.

2. State of the Art

In the well known art of injection molding, it is common practice to fill a mold quickly by injecting material through a gate orifice to fill the cavity and, then, holding pressure on the material source to make up for volume loss in the molded part as it cools. This is known as "packing" the cavity and results in inherently more precise moldings than processes which lack "packing" capability. Next the gate orifice is closed, either mechanically by means of a valve pin, or by freezing a small slug of the molding material in the orifice. Finally, the molded part is removed from the cavity. There exists a wide array of apparatus for gating and valving molten material into cavities under pressure and for maintaining molten material in distributors and manifolds during the "packing" phase of the molding cycle. Many are designed to insure minimum gate "vestige" marks on the parts as they are removed from the mold.

Compression molding of thermoplastics has some advantage over injection molding in certain applications where material properties may be degraded by relatively long residence times in the molten state or mechanical shearing as the material passes through small gate orifice under very high pressure. Compression molding is also capable of creating greater cavity pressure for forming fine details in very stiff or viscous materials which cause a large pressure drop when injected through a small orifice. There is a requirement for providing a precise charge of molten material to the cavity prior to closing the mold to form a part. Much of the technology of compression molding has been focused on improving the accuracy of metering these charges.

The problem of precise metering is addressed in patents covering methods and apparatus for improved metering means. However, none of the known metering means completely solves the problem of variable part weight due to variance in metering. Therefore, a significant problem with compression molded or hot forged thermoplastic parts remains that parts must be:

A. either under molded or over molded (flashed) in compression molds with fixed molding cavity volume, or B. vary in some physical dimension in compression molds with variable (telescoping) molding cavity volume.

In practice, if no molded part dimensions are allowed to vary, molds are designed to deliberately flash excess material which necessitates a subsequent flash removal step in manufacturing. A further problem with present practices arises when the material being molded has a significant shrinkage factor associated with cooling. That occurs when a fixed displacent mold is initially closed on an excess charge of hot material and flashes, there is no way to make up for the volume loss as the part shrinks during cooling. The result is an under molded part which must still be trimmed of flash.

SUMMARY OF THE INVENTION

The present invention involves the application of injection molding hot runner technology and apparatus to compression molding to eliminate the need for precise metering of material for charging the cavity in compression molding of thermoplastic materials. The present invention takes advantages inherent in both molding operations. The basic compression molding approach eliminates material properties degradiation associated with injection molding while providing for high cavity pressure and the ability to form fine detail in very viscous molten materials. By "reverse gating" the compression molding cavity with injection molding apparatus appropriate to the particular thermoplastic material and gate vestige requirements, the ability to "pack" the compression molding cavity has been added for greater inherent precision in the molding process.

This invention utilizes a molding machine having a core block and a cavity block arranged to be moved relative to one another from a spaced apart open position in which thermoplastic material is charged into the cavity block to a closed position in which the core block is pressed into the cavity block to form a part. At least initially, the weight of thermoplastic charged into the cavity block will be in excess of the weight of the finished part. An expansion-venting chamber is connected to the molding cavity in the cavity block through a gate orifice. A vent passage is connected to the chamber, and pressure is maintained in the chamber. Vent means vents excess thermoplastic material from the chamber through the vent passage, and means is provided for closing the vent passage while continuing to maintain chamber pressure to feed thermoplastic material from the chamber to the molding cavity during the cooling and curing of the part. Finally the gate orifice is closed so that the part can be ejected from the cavity when the core block and cavity block are moved to an open position.

In a preferred embodiment of the invention a spring loaded piston is located in the chamber in a manner to retract the piston as excess material is introduced into the chamber through the gate orifice from the molding cavity. As the piston is retracted, it opens the vent passage allowing excess thermoplastic material to be vented. Thereafter the spring moves the piston to close the vent passage and to reintroduce thermoplastic material from the chamber through the gate orifice into the molding cavity as the molding cavity is being cooled to compensate for material shrinkage. After the first few molding cycles, the chamber will be filled or have sufficient thermoplastic material so that the material charged into the cavity block can be adjusted to provide an average charge equal to or only slightly above the finished part weight. This reverse gating of the molding cavity eliminates the need for precise metering of the initial charge of thermoplastic material to the molding cavity.

A heater, preferably located in the piston, keeps the thermoplastic material in the chamber fluid for successive molding cycles. Cooling of the cavity is arranged to also cool the gate orifice to freeze a slug of thermoplastic material to seal the molding cavity after initial cooling and packing of the cavity by the reverse flow of thermoplastic material from the chamber to the cavity through the gate orifice.

BRIEF DESCRIPTION OF THE DRAWING

The advantages of the present invention will be more apparent from the following detailed description when considered in connection with the accompanying drawing wherein:

FIG. 1 is a side elevational view partially in section of the molding machine according to the invention showing the core block spaced from the cavity block in their open position receiving a charge of thermoplastic material in the molding cavity of the cavity block;

FIG. 2 is a cross sectional view on line 2—2 of FIG. 1;

FIG. 3 is a partial elevational view similar to FIG. 1 showing the core block pressed into the cavity block distributing the thermoplastic material within the molding cavity with the excess material being vented through the gate orifice to a pressure chamber and through the pressure chamber to a vent passage;

FIG. 4 is a view similar to FIG. 3 showing the completion of the venting process and the reintroduction of thermoplastic material from the pressure chamber to the molding cavity during the cooling cycle; and FIG. 5 is a view similar to FIGS. 3 and 4 showing the cavity block and core block in their open position with the molded part being ejected.

DETAILED DESCRIPTION OF THE PREFERRED EMBODIMENT OF THE INVENTION

Referring to FIG. 1, the invention is shown in the compression molding machine 10 which includes a core block 12 and a cavity block 14 illustrated in the open position of the machine receiving a charge 16 of thermoplastic material in the molding cavity 18. The core block is pressed into the cavity block as shown in FIG. 3 to form a part 20 in the cavity 18 between the molding surfaces of the core block 12 and the cavity block 14.

The cavity block 14 has a pressure chamber 22 in communication with molding cavity 18 through gate orifice 24. A piston 26 is disposed in the pressure chamber 22, being biased toward the gate orifice 24 by a spring 28 acting between piston shoulder 30 and pressure adjusting nut 32. A vent passage 34 is located in the cavity block 14 in communication with pressure chamber 22 when the piston is moved downwardly against the biasing force of spring 28. Coolant passages 36 are located in the cavity block 14 for cooling the molding cavity 18 and the gate orifice 24. A heater 38 is located in the piston 26 to heat the pressure chamber 22.

The charge 16 of thermoplastic material introduced into the molding cavity 18 when the core block 12 is separated from the cavity block 14 as shown in FIG. 1 is in excess of the amount of material required to form the part 20. When the core block 12 is pressed into the cavity block 14, the pressure in excess of the molding pressure discharges the excess thermoplastic material from the molding cavity 18 through the gate orifice 24 into pressure chamber 22. The piston 22 is retracted against the force of spring 28 by the in flowing thermoplastic material as shown in FIG. 3 to the point where the piston uncovers the vent passage 34 so that excess thermoplastic material is vented through passageway 34.

As the material in the molding cavity 18 cools by coolant passing through passages 36, it shrinks allowing the piston 26 to move forward under the pressure of spring 28 closing the vent passage 34 to reintroduce thermoplastic material through gate 24 from the pressure chamber 22 into the molding cavity 18 to accommodate for shrinkage during the cooling and curing of the part 20 being formed. Pressure is maintained by the spring 28 during cooling and the material is free to continue to flow into the molding cavity 20 until the material in the gate orifice 24 freezes, blocking the gate. The mold is then opened as shown in FIG. 5 and the finished part 20 is ejected by movement of the ejector pin 40.

The heater 38 keeps the thermoplastic material in pressure chamber 22 fluid so that any charge 16 of thermoplastic material in the molding cavity 18 in excess of the amount required to form the part 20 will again be vented through passage 34 as the piston is retracted by the flow of thermoplastic material from the molding chamber 18 into the pressure chamber 22 through gate 24.

It will be seen that operating this process continuously with an excess charge weight over finished part weight could lead to a significant scrap loss of raw material. However, after the first cycle, it is possible to adjust charge weight such that the average charge is equal or only slightly above the desired weight of the finished part. This is possible because the volume in the pressure or expansion chamber 22 acts as a buffer or reservoir to eliminate underfilling the cavity when charge weight falls below desired part weight on any given cycle.

It will also be obvious to those skilled in the art that various methods of venting the expansion chamber are possible. One such alternative would be to provide a slightly enlarged section of the expansion chamber bore at the end opposite the gate. Excess material would only be vented when the chamber is completely filled. This provides the advantage of periodically or continuously flushing material from the back of the chamber so as to eliminate material with excessive residence time in the chamber from working its way back into the part.

I claim:

1. A method of compression molding a part with thermoplastic material comprising the following steps:

a) providing a core block;

b) providing a cavity block with a cavity arranged to form a part when the core block is pressed into the cavity block;

c) providing a pressure chamber in communication with the cavity through a gate orifice;

d) introducing a charge of thermoplastic material to the cavity in excess of the amount material to form the part;

e) pressing the core block into the cavity block, forming the part while allowing excess material to pass from the cavity through the gate into the pressure chamber;

f) venting excess material from the pressure chamber;

g) cooling the cavity block, allowing the part to cure and solidify;

h) maintaining pressure in said pressure chamber to cause a flow of material from the pressure chamber through the gate orifice into the cavity as the material in the cavity shrinks as the material is being cooled;

i) closing the gate orifice;

j) separating the core block from the cavity block;

k) removing the molded part from the cavity.

2. The method according to claim 1 including repeating steps d) through k).

3. The method according to claim 2 including in step d) adjusting the average charge weight of thermoplastic material to equal or only slightly exceed the weight of the finished part thus using the pressure chamber in steps e) and f) to act as a buffer to average charging weight variability from cycle to cycle.

4. The method according to claim 2 including the step of heating the pressure chamber to keep the thermoplastic material in the chamber fluid between molding successive parts.

5. The method according to claim 2 wherein the gate orifice is closed in step i) by allowing a small slug of thermoplastic material to freeze in the gate orifice.

6. The method according to claim 2 wherein in step c) the pressure chamber is provided with a spring loaded plunger so that during step e) excess material entering the pressure chamber through the gate orifice pushes the plunger back against the spring to expose a vent for venting the excess material in step f), and as the cavity block is cooled in step g), the spring will apply a force on the plunger to cause the back flow of material into the cavity in step h), assuring the cavity remains full of material as shrinkage occurs during cooling thus forming a full uniform part, and the movement of the plunger under the force of the spring will close the vent in step i).

7. In a molding machine having a core block and a cavity block arranged to be moved relative to one another from a spaced apart open position in which thermoplastic material is charged into said cavity block to a closed position in which said core block is pressed into said cavity block to form a part, the improvement comprising:

an expansion-venting chamber connected to a molding cavity in said cavity block through a gate orifice;

a vent passage connected to said chamber;

pressure means for maintaining pressure in said chamber;

a valve between said chamber and said vent passage for venting excess thermoplastic material from said chamber through said vent passage when said valve is in an open position;

an injector pin movable with respect to said molding cavity; and means for closing said gate orifice;

wherein said chamber, gate orifice, vent passage, pressure means and valve are operatively connected to receive excess thermoplastic material from said cavity through said gate orifice into said chamber and to vent excess material from said chamber through said vent passage when said valve is in its open position, and said pressure means being arranged to close said valve and to feed thermoplastic material from said chamber to said molding cavity to accommodate shrinkage in said cavity during cooling and curing of said part, and said injector pin being arranged to eject said part from said cavity when said core block and said cavity block are in the open position.

8. Molding apparatus according to claim 7 wherein said pressure means and said valve includes a piston in said chamber, movement of said piston in said chamber maintaining pressure in said chamber and opening said chamber to said vent passage.

9. Molding apparatus according to claim 8 wherein said pressure means includes a spring acting against said piston, and wherein when the core block and cavity block are moved from the open to the closed position, excess thermoplastic material will be introduced into said chamber through said gate orifice and move said piston against said spring to open said vent passage, allowing excess thermoplastic material to be vented and thereafter allowing the spring to move the piston to close said vent passage and to reintroduce thermoplastic material from said chamber through said gate orifice into said molding cavity as said molding cavity is being cooled.

10. Molding apparatus according to claim 7 including heating means for heating said chamber to keep thermoplastic material therein fluid.

11. Molding apparatus according to claim 10 wherein said heating means includes a heater on said piston.

12. Molding apparatus according to claim 7 wherein cooling coils are arranged in said cavity block to selectively cool said molding cavity and said gate orifice allowing thermoplastic material to be fed into said molding cavity as the part is being cooled to compensate for shrinkage, and thereafter cooling the gate orifice to freeze a slug of thermoplastic material therein, sealing said molding cavity.

* * * * *